United States Patent [19]

Stevens

[11] Patent Number: 4,871,397

[45] Date of Patent: Oct. 3, 1989

[54] PROCESS FOR DECOLORIZING AQUEOUS SUGAR SOLUTION

[75] Inventor: Rex R. Stevens, Midland, Mich.

[73] Assignee: The Dow Chemical Company, Midland, Mich.

[21] Appl. No.: 192,749

[22] Filed: May 9, 1988

[51] Int. Cl.$^4$ ............................ C13D 3/14; C13D 3/12
[52] U.S. Cl. ..................................... 127/55; 127/46.2; 127/46.3; 502/402
[58] Field of Search ......................... 127/55, 46.2, 46.1, 127/46.3, 49; 502/402

[56] References Cited

U.S. PATENT DOCUMENTS

| | | | |
|---|---|---|---|
| 2,631,999 | 3/1953 | McMaster et al. | 260/88.1 |
| 2,785,998 | 3/1957 | Harding et al. | 127/46.2 |
| 3,417,066 | 12/1968 | Corte et al. | 260/88.1 |
| 3,637,535 | 1/1972 | Corte et al. | 260/2.1 |
| 3,966,489 | 6/1976 | Barrett et al. | 127/46 A |
| 4,191,814 | 3/1980 | Amick | 521/32 |
| 4,273,878 | 6/1981 | Amick | 521/32 |
| 4,427,793 | 1/1984 | Reed et al. | 521/32 |

OTHER PUBLICATIONS

Vysokomolekulyarnye Soedineniya, vol. (a) XXIII, Nr. 8, 1981, pp. 1852–1856, "Features of Porous Structure of Macroporous Low–Basic Anionites Based on Ethylenediamine" by Brutskus, et al.

*Primary Examiner*—H. M. S. Sneed
*Assistant Examiner*—Chung K. Pak

[57] ABSTRACT

Improved process for decolorizing aqueous sugar solutions by contacting solution with an adsorbent anion exchange resin prepared by aminating a·macroporous, chloromethylated copolymer with a polyamine under conditions sufficient to promote crosslinking of unreacted amine sites with chloromethyl groups on the copolymer.

20 Claims, 3 Drawing Sheets

PROCESS FOR DECOLORIZING AQUEOUS SUGAR SOLUTION

BACKGROUND OF THE INVENTION

The present invention relates to a process for decolorizing aqueous sugar solutions.

Decolorization is a key process in sugar refining. Traditionally, aqueous sugar solutions are decolorized with carbon adsorbents such as bone char or granular and powdered carbon. Unfortunately, carbon adsorbents typically require thermal regeneration to remove adsorbed components from the carbon. Therefore, the cost of regenerating carbon adsorbents increases as fuel costs increase. Further, the thermal regeneration of carbon adsorbents is difficult, time-consuming, and may also destroy an appreciable portion of the carbon.

Ion exchange resins have been used to demineralize and decolorize sugar solutions in an attempt to eliminate the difficulties encountered using carbon as a decolorizer. For example, U.S. Pat. No. 4,193,817 discloses decolorizing a bottler's sugar solution with a strong base anion exchange resin. Unfortunately, the capacity of these resins for adsorbing color bodies is low relative to the adsorptive capacity of carbon. Therefore, a more efficient process for decolorizing aqueous sugar solutions using an ion exchange resin is needed.

SUMMARY OF THE INVENTION

The invention is an improvement in the process of decolorizing an aqueous sugar solution by contacting the solution with an anion exchange resin. The improvement comprises using an adsorbent anion exchange resin prepared by aminating a macroporous, chloromethylated copolymer with a polyamine under conditions sufficient to promote crosslinking of unreacted amine sites with chloromethyl groups on the copolymer.

The improved process of this invention provides an efficient means for decolorizing an aqueous sugar solution. The crosslinking of unreacted amine sites with chloromethyl groups on the copolymer creates an amine-bridged resin that has increased porosity. The increase in porosity enhances the capacity of the resin to adsorb color bodies. Therefore, the polyamine-functionalized resin can decolorize an aqueous sugar solution more efficiently than a conventional anion exchange resin.

DETAILED DESCRIPTION OF THE INVENTION

Figure 1:
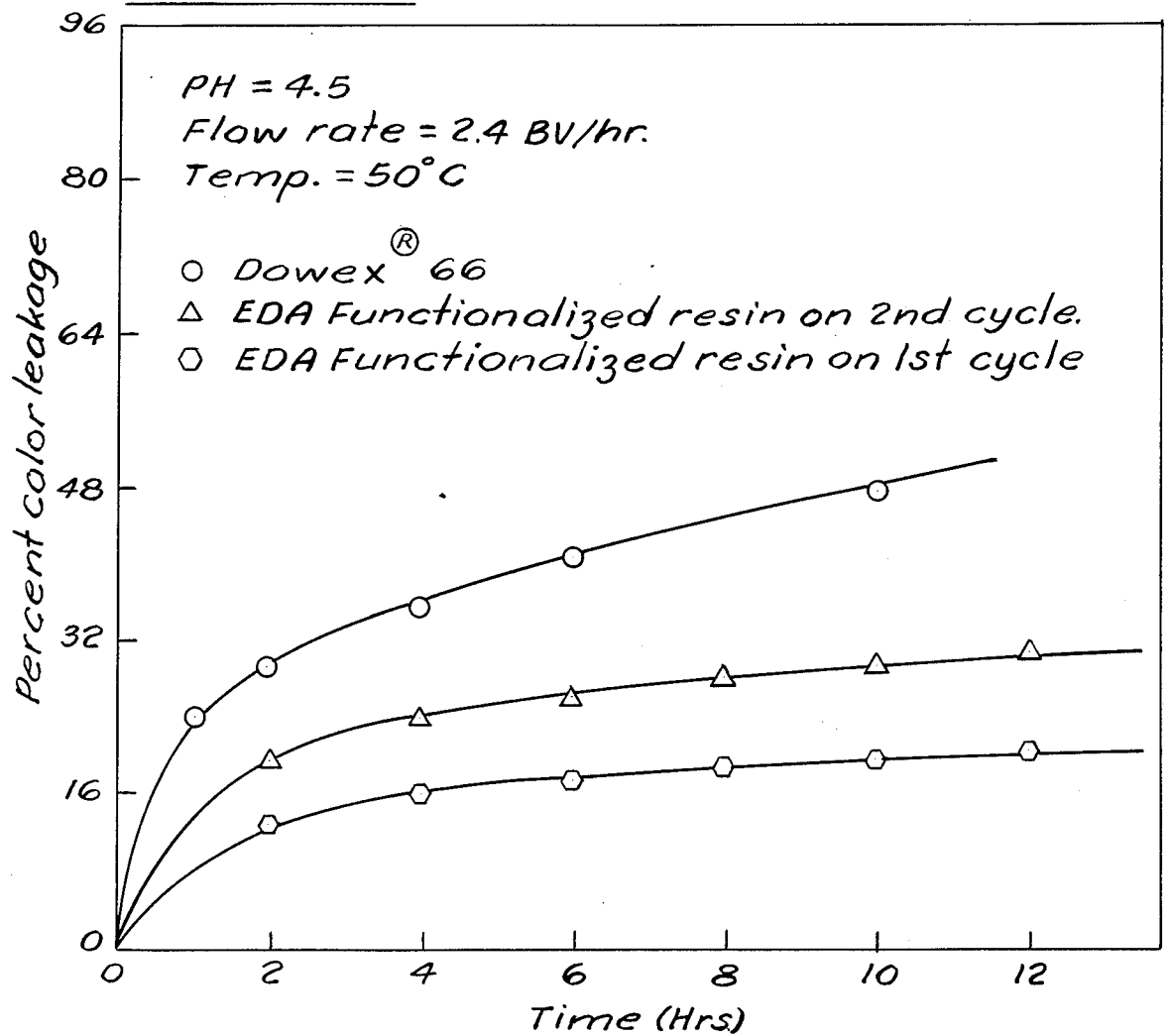
FIGS. 1-3 are plots of the capacity of polyamine-functionalized resins and a conventional anion exchange resin to decolorize aqueous sugar solutions over time.

The polyamine used for amination can be any polyamine that has at least two amine groups, preferably terminal amine groups, each one of which is capable of reacting with a chloromethyl group on the copolymer. Examples of polyamines useful in the process of this invention include, but are not limited to, lower molecular weight aliphatic polyamines such as ethylene diamine, propylene diamine (1,3-diaminopropane), butylene diamine (1,4-diaminobutane), diethylene triamine, and dipropylene triamine; and aromatic diamines such as phenylenediamine and benzidine. The preferred polyamines are ethylene diamine and propylene diamine.

The preferred copolymer is a crosslinked aromatic copolymer of a polyunsaturated monomer and a monoethylenically unsaturated monomer. Advantageously, at least 50 weight percent of the comonomer composition comprises an aromatic monomer. Preferred polyunsaturated monomers include divinylbenzene (commercially available divinylbenzene containing less than about 45 weight percent ethylvinylbenzene), trivinylbenzene, and ethylene glycol diacrylate. Preferred monoethylenically unsaturated monomers include styrene, α-methylstyrene, vinylpyridine, vinyl toluene, vinyl naphthalene, vinylbenzyl chloride and methyl methacrylate.

The preferred aromatic copolymer is a copolymer of up to about 99.75 weight percent styrene with the balance divinylbenzene. Another preferred copolymer is a copolymer of about 40 to about 60 weight percent styrene, about 40 to about 60 weight percent vinylbenzyl chloride and about 1 to about 20 weight percent divinylbenzene. The copolymers may contain minor amounts of other monomers, such as about 1 to about 4 weight percent acrylonitrile.

The polyunsaturated monomer acts as a crosslinker to increase the physical stability of the copolymer. For the preparation of a macroporous copolymer about 0.25 to about 20 weight percent, preferably about 1 to about 15 weight percent, and more preferably about 4 to about 10 weight percent polyunsaturated monomer is desirable to achieve effective crosslinking.

Exemplary processes for preparing macroporous, chloromethylated copolymers are well known in the art and are sufficiently described in U.S. Pat. Nos. 4,382,124; 4,221,871 and 3,637,535.

In a preferred embodiment, the macroporous, chloromethylated copolymer is expanded in a swelling solvent before amination. Conventional swelling solvents include methylal, dimethoxyethane and dioxane, although any inert solvent capable of swelling the copolymer beads would be adequate. The amount of swelling solvent required is an amount sufficient to swell and slurry the copolymer, and can be readily determined empirically.

The swollen, chloromethylated copolymer is advantageously aminated in the presence of a polar solvent. The polar solvent solubilizes amine hydrochloride salts that form during amination, therefore preventing agglomeration of copolymer particles. The polar solvent also promotes crosslinking of unreacted amine sites with chloromethyl groups on the copolymer. Although any polar solvent is adequate, the preferred polar solvents are water, methanol and ethanol. The amount of polar solvent required can be determined empirically. For water, about 5 to 10 weight percent based on the weight of total solvent is preferred. For methanol, about 10 to 20 weight percent is preferred.

The polar solvent can be mixed with the slurry of copolymer particles before amination, or a mixture of the polar solvent and the polyamine can be prepared. Preferably, the polar solvent is added to the slurry of copolymer particles before amination.

The amount of polyamine generally required for amination can range from about 0.5 to 2 moles of amine per mole of chloromethyl group, preferably from about 0.5 to 1 mole of amine per mole of chloromethyl group. The polyamine is advantageously added to the slurry of copolymer particles continuously at a rate sufficient to control the temperature of the exothermic amination reaction. Preferably, the temperature is maintained below the boiling point of the solvent system used. When the polyamine is added in this manner, a major portion of the amination reaction occurs in the presence of excess chloromethyl groups. This excess of chloromethyl groups promotes crosslinking of the unreacted amine sites.

After all of the polyamine is added, the amination is completed by raising the temperature to reflux and maintaining reflux for about 1 to 2 hours.

Examples of aqueous sugar solutions that are advantageously treated according to the present invention include carbohydrate solutions derived from corn starch, such as corn syrup, high fructose corn syrup, dextrose, sorbitol, beet and cane sugar, palm sugar, maple sugar; fruit juices, either natural or processed, such as pear, apple, grape and pineapple mill juices; sugar solutions derived from sorghum; and high fructose syrups derived from tapioca, inulin and potatoes. Preferably, the sugar solution is a solution of corn syrup, high fructose corn syrup or dextrose.

The term "decolorizing" refers to removing color bodies from solution to the extent necessary or desired. The decolorization of sugar solutions and more particularly high fructose corn syrup is not an ion exchange phenomena but is mainly a Van der Waal-type interaction of the color bodies with the ion exchange resin. The term "color bodies" refers not only to materials affecting the color of the sugar solution, but also to precursors of such materials. Although identifying color bodies is difficult, it is believed that the color bodies consist of three basic groups. These groups are: (1) caramels, (2) melanoidins and (3) polyphenolics and flavanoids. The caramels are thermal degradation products of sugars; melanoidins are, in general, Maillaird reaction products of amine compounds and sugar groups; and the polyphenolics and flavanoids are oxidation products of phenolic compounds derived from a raw sugar solution.

In addition to the three classes of color bodies, there are several noncolored compounds that can develop color, or react to form color bodies during processing or storage of sugar solutions. Such materials are known as color precursors. These precursors include amino acids; many hydroxy acids and aldehydes; iron, which complexes with phenolics to make color bodies; 5-hydroxymethylfurfural (HMF); 3-deoxy-d-glucosone (3-D-G) and reducing sugars. These materials often have low molecular weight and are difficult to remove from a sugar solution.

The degree of decolorization necessary or desired will vary from industry to industry or solution to solution. For example, in the beet and cane sugar industry, solutions typically have color levels up to thousands of Reference Base Units (RBU) with the goal of removing sufficient color bodies so that the solutions have color levels no more than hundreds of RBU. In the high fructose corn syrup industry, color levels rarely go beyond a few hundred RBU with the goal of producing a water white syrup having only a few RBU of color.

The adsorbent anion exchange resin and the sugar solution may be contacted using conventional methods which result in intimate contact between the agent and the sugar solution. Suitable methods include fluidized beds, stirred tanks, batch tanks, and cocurrent and countercurrent flow columns. The contacting may occur batchwise, semi-batchwise, semi-continuously or continuously. Preferably, the solution is contacted with the agent continuously in a packed column.

The residence time required for contact between the resin and the sugar solution depends on the properties of the agent, amount of color bodies present initially, level of decolorization desired, amount of agent used, viscosity, concentration of dissolved sugar, temperature, and pH. Preferably, the residence time ranges from about 0.1 hours (10 bed volumes/hr) to about 10 hours (0.1 bed volumes/hr), more preferably about 0.12 hours (8 bed volumes/hr) to about 1 hour (1 bed volume/hr), and most preferably about 0.17 hours (6 bed volumes/hr) to about 0.5 hours (2 bed volumes/hr).

The temperature should remain below the temperature at which the sugar solution is adversely affected. Generally, temperatures ranging from about 20° C. to about 80° C. are operable. Preferably, the temperature ranges between about 38° C. and about 55° C.

The amount of anion exchange resin required largely depends on equipment configuration, concentration of dissolved solids, the level and type of color bodies present, and the level of decolorization desired. Suitable amounts of resin range from about 1 to about 0.005 kilograms of resin per kilogram of aqueous sugar solution (kg/kg), preferably about 0.3 to about 0.007 kg/kg, more preferably about 0.017 to about 0.008 kg/kg.

The pH of the sugar solution is preferably maintained at a level which allows for the optimum adsorption of color bodies by the anion exchange resins. The pH of the sugar solution prior to decolorization depends on previous processing steps. It is desirable to contact the anion exchange resin and the sugar solution at a pH ranging from about 1 to about 7, preferably about 3 to about 6, and more preferably about 4 to about 5.

The amount of dissolved sugar present in the sugar solution will vary with the sugar source. The amount of dissolved sugar ranges up to about 70 weight percent with about 20 to about 50 weight percent being more preferred.

After the resin has been loaded with color bodies, the resin can be regenerated using known techniques. For example, the resin can be regenerated by first contacting the resin with an aqueous solution of sodium chloride and either an alkali metal or alkaline earth metal hydroxide (required to convert resin to hydroxide ion form) and then contacting the resin with an aqueous solution of either sodium chloride or hydrochloric acid (required to convert resin to desired hydrochloric acid form for subsequent decolorization of sugar solution).

The following example illustrates but does not limit the scope of this invention.

EXAMPLE

For each of three runs, a 100 ml sample of macroporous, chloromethylated styrene-divinylbenzene (6 weight percent divinylbenzene) copolymer beads is washed with 100 ml of methanol in a Buchner funnel and air dried overnight. For the first run, 16 g (85 meq/$CH_2Cl$) of the dried beads are swelled in 75 ml of methylal for 1 hour at 44° C. in a 250 ml, 3-necked flask fitted with a stirrer, condenser and dropping funnel. For the second run, 16 g of the dried copolymer beads are swelled in 70 ml of ethylenedichloride (EDC) at 50° C.

For each of the first two runs, a mixture of 34 ml (0.5 moles) ethylenediamine (EDA) and 35 ml of methanol are added dropwise to the slurried beads over 1 hour as the slurry is agitated. After finishing the addition of the EDA, the reaction mixture is stirred for three hours.

For the first run, the reaction temperature is controlled between 44° to 45° C. For the second run, the reaction temperature is controlled between 55° to 60° C.

The reaction mixture is filtered and the aminated resin is washed with excess methanol and then with excess water. The washed resin is stirred in 200 ml of 1.0N NaOH for 1 hour and bachwashed to neutral pH. The free base form of the resin for the first two runs has the properties illustrated in Table I.

TABLE I

Properties of Polyamine-Functionalized Anion Exchange Resins

| | Swelling Solvent | |
|---|---|---|
| | Methylal | EDC |
| Weak Base Capacity, meq/ml | 1.62 | 1.47 |
| Strong Base Capacity, meq/ml | 0.1 | 0.03 |
| Water Retention Capacity, percent | 49 | 52 |
| Dry Weight Capacity, meq/g | 5.3 | 4.69 |
| Porosity, cc/g | 0.56 | 0.68 |

For the third run, the copolymer beads are swollen in EDC and aminated with diethylenetriamine (DETA) under conditions substantially similar to the conditions described for the first two runs.

The decolorizing capacity of each of the polyamine-functionalized resins is measured by pumping high fructose corn syrup (50 weight percent dissolved solids) or acidified sugar beet syrup (35 weight percent dissolved solids at pH=4.5) through 5 cc of the resin in a 1 cm×5 cm glass column at 2.4 bed volumes/hr at 50° C. The concentration of color bodies in the syrup exiting the column is continuously monitored by a UV spectrophotometer at 420 nm. This concentration is divided by the concentration of color bodies in the syrup entering the column to determine the percent color leakage.

Figure 2:
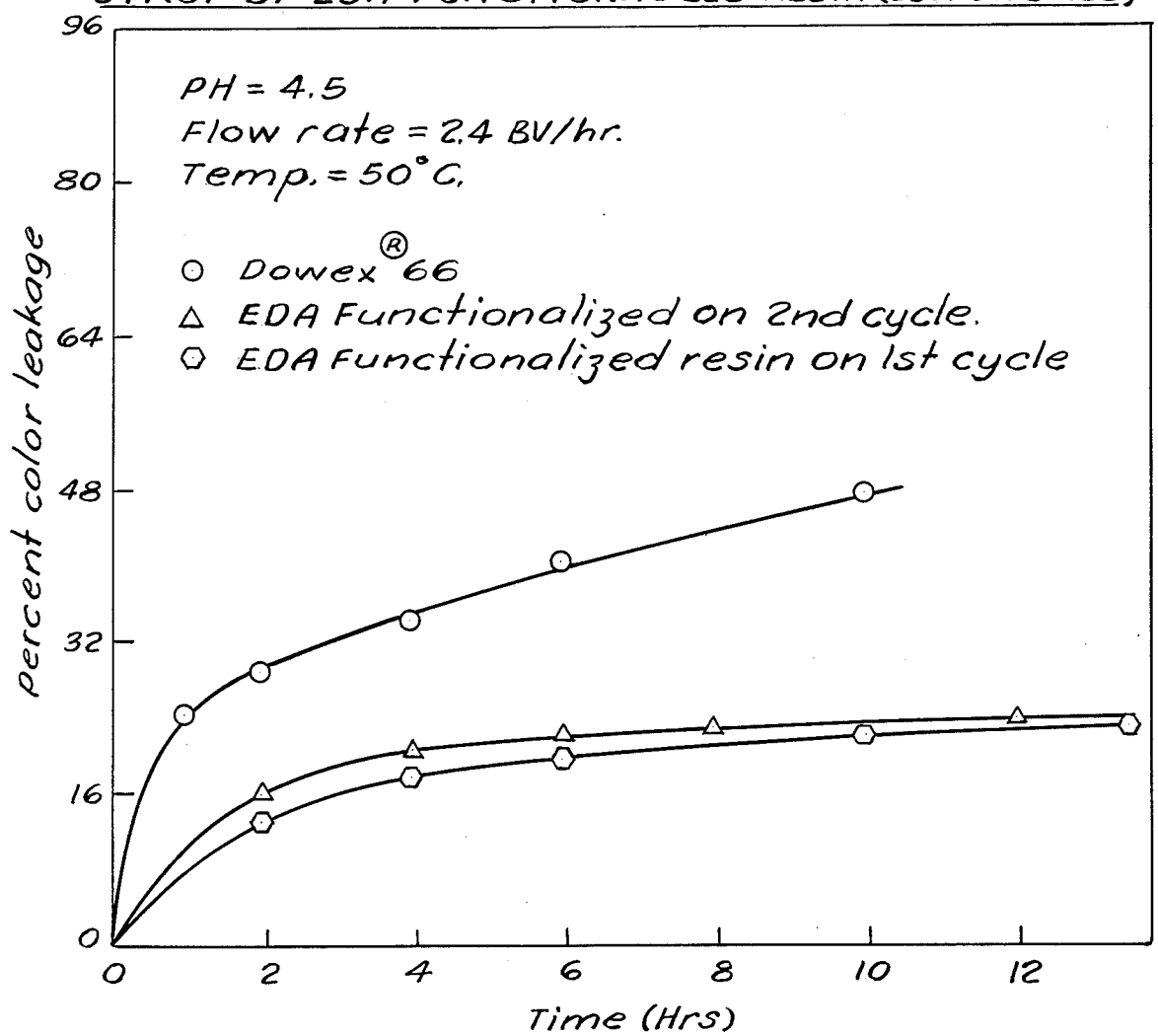
Figure 3:
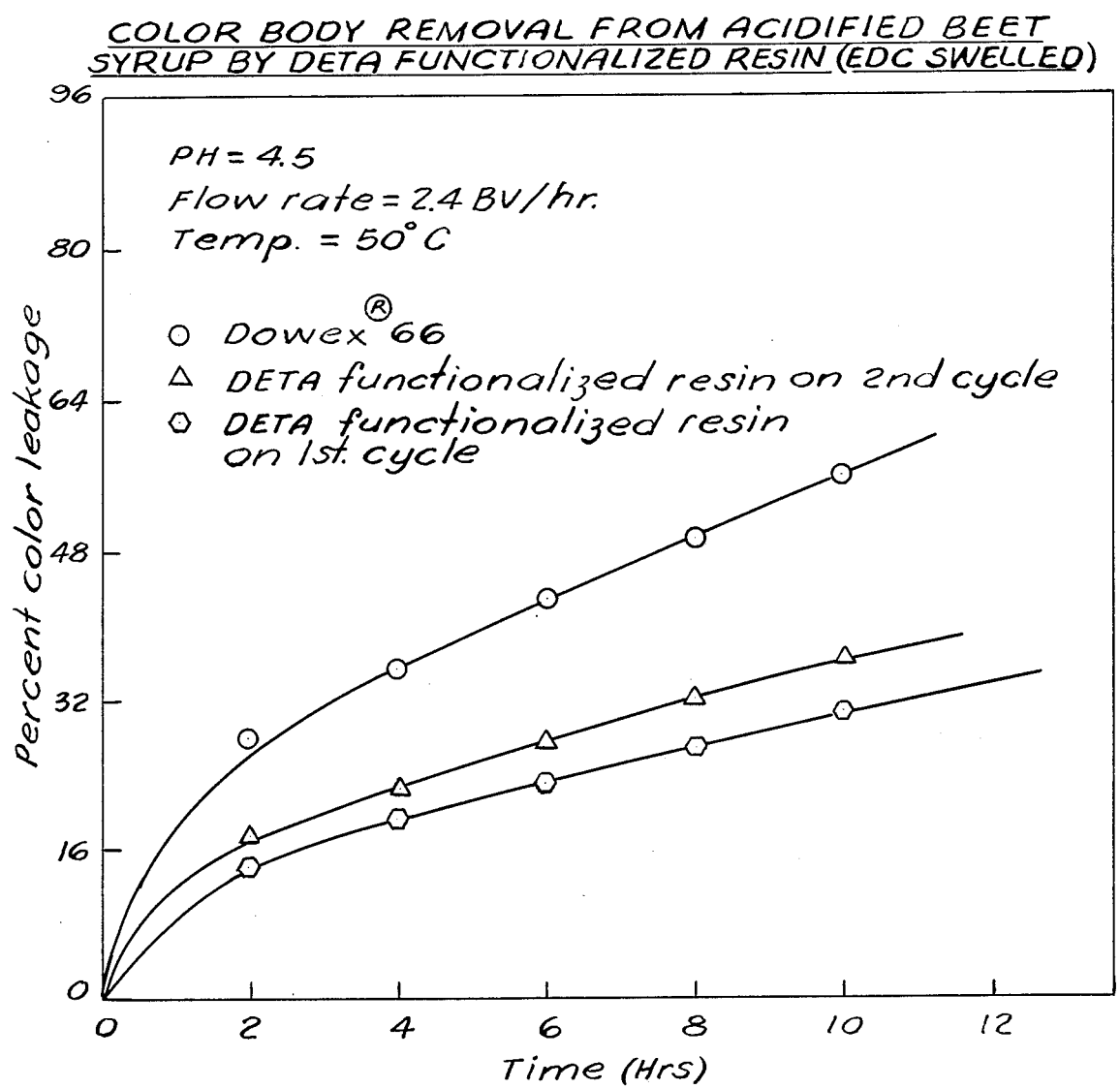

FIGS. 1-3 plot a comparison of the percent color leakage for each resin and for a conventional weak base anion exchange resin. The conventional resin is prepared by aminating an macroporous, chloromethylated copolymer of styrene and divinylbenzene with dimethylamine, sold commercially by The Dow Chemical Company under the trademark DOWEX 66. Cycle 1 is the percent color leakage for the fresh resin in the HCl form. Cycle 2 is the percent color leakage for the resin after loading the resin to 50 percent color leakage and then regenerating with 1.0N NaOH and 1.0N HCl.

FIGS. 1-3 illustrate a significant reduction in color leakage for each of the polyamine-functionalized resins relative to the color leakage of a conventional anion exchange resin.

What is claimed is:

1. An improved process for decolorizing an aqueous sugar solution by contacting the solution with an anion exchange resin, the improvement comprising using an adsorbent anion exchange resin prepared by aminating a macroporous, chloromethylated copolymer with a polyamine with amine groups selected from primary and secondary amine groups and a combination thereof under conditions sufficient to promote crosslinking of unreacted amine sites with chloromethyl groups on the copolymer.

2. The process of claim 1 wherein the polyamine is aliphatic.

3. The process of claim 2 wherein the aliphatic polyamine is a diamine.

4. The process of claim 3 wherein the aliphatic diamine is ethylene diamine or 1,3-diaminopropane.

5. The process of claim 1 wherein the macroporous, chloromethylated copolymer is aminated in the presence of a polar solvent.

6. The process of claim 5 wherein the polar solvent is water or methanol.

7. The process of claim 1 wherein macroporous, chloromethylated copolymer is aminated continuously at a rate sufficient to control the temperature of the exothermic amination reaction.

8. The process of claim 1 wherein the macroporous, chloromethylated copolymer is a crosslinked aromatic copolymer.

9. The process of claim 8 wherein the crosslinked aromatic copolymer is a copolymer of a polyunsaturated monomer and a monoethylenically unsaturated monomer.

10. The process of claim 9 wherein the polyunsaturated monomer and the monoethylenically unsaturated monomer comprise at least 50 weight percent of an aromatic monomer.

11. The process of claim 10 wherein the polyunsaturated monomer is divinylbenzene, trivinylbenzene or ethylene glycol diacrylate.

12. The process of claim 10 wherein the monoethylenically unsaturated monomer is styrene, $\alpha$-methylstyrene, vinylpyridine, vinyltoluene, vinylbenzyl chloride, vinylnaphthalene or methyl methacrylate.

13. The process of claim 10 wherein the copolymer is a copolymer of up to about 99.75 weight percent styrene with the balance divinylbenzene.

14. The process of claim 1 wherein the aqueous sugar solution is a solution of corn syrup, a fruit juice or dextrose.

15. The process of claim 1 wherein the aqueous sugar solution is contacted with the anion exchange resin continuously in a packed column.

16. The process of claim 1 wherein the residence time for contact between the anion exchange and the sugar solution is about 0.17 hours to about 0.5 hours.

17. The process of claim 1 wherein the amount of anion exchange resin is from about 0.017 to about 0.008 kg/kg aqueous sugar solution.

18. The process of claim 1 wherein the pH of the sugar solution is about 4 to about 5.

19. The process of claim 1 wherein the amount of dissolved sugar in the sugar solution is about 20 to about 50 weight percent.

20. The process of claim 1 wherein the aqueous sugar solution comprises a solution of high fructose corn syrup.

* * * * *